United States Patent [19]

Fry et al.

[11] 4,370,902

[45] Feb. 1, 1983

[54] DRIVE MECHANISMS, MORE PARTICULARLY FOR VALVE ACTUATORS

[75] Inventors: Jeremy J. Fry; Peter R. Smith, both of Lower Weston, England

[73] Assignee: Rotork Controls Limited, Bath, England

[21] Appl. No.: 190,879

[22] Filed: Sep. 25, 1980

[30] Foreign Application Priority Data

Sep. 28, 1979 [GB] United Kingdom ............... 7933691

[51] Int. Cl.³ ............................................. F16H 35/00
[52] U.S. Cl. .................................. 74/625; 192/114 R; 192/48.91
[58] Field of Search ................. 251/130; 74/625, 400, 74/333; 192/20, 48.9, 48.91

[56] References Cited

U.S. PATENT DOCUMENTS

| | | | |
|---|---|---|---|
| 2,150,213 | 3/1939 | Everett | 74/333 |
| 2,197,238 | 4/1940 | Eckenrode | 74/333 |
| 2,203,282 | 6/1940 | Keese | 74/333 |
| 2,529,660 | 11/1950 | Meyer et al. | 74/625 |
| 3,257,866 | 6/1966 | Fry | 74/625 |
| 3,298,249 | 1/1967 | Nott | 74/625 |
| 3,603,175 | 9/1971 | Horton | 74/625 |
| 3,648,546 | 3/1972 | McNamara et al. | 74/333 |
| 3,740,146 | 6/1973 | Wilharm | 192/48.9 |
| 3,863,745 | 2/1975 | Fry | 74/625 |
| 4,289,223 | 9/1981 | Strehler et al. | 192/48.91 |

*Primary Examiner*—Lawrence J. Staab
*Attorney, Agent, or Firm*—Stevens, Davis, Miller & Mosher

[57] ABSTRACT

This invention relates to a motorized actuator in which the motor shaft is drivably connected with the output shaft through an intermediate shaft assembly.

The motor shaft assembly includes a worm and wormwheel which is formed with cut-outs each drivably receiving the extended ends of some of the teeth of a pinion which forms part of the intermediate shaft assembly. The pinion is at all times in driving engagement with a gear on the output shaft and is axially movable by a lever to disengage the motor drive so as to allow independent manual operation of the pinion and thereby the output shaft by a handwheel mounted on a shaft. The shaft is drivably coupled with a wormwheel which is in driving engagement with the pinion by means of the driving lugs.

8 Claims, 5 Drawing Figures

DRIVE MECHANISMS, MORE PARTICULARLY FOR VALVE ACTUATORS

This invention relates to drive mechanisms, such as valve actuating mechanisms, for transmitting a controlled drive from a driving member to a driven member. In particular, but not exclusively, the invention relates to mechanisms by which a drive is transmitted from the power unit of a motorised actuator to its output shaft for operating, for example, a valve.

In motorised actuators as presently manufactured, such as those described in our British Pat. Nos. 939,353 and 998,596, the power unit comprises an electric motor driving a worm and wheel, the wormwheel of which is positively connected to the output shaft of the actuator through a keyed driving member or clutch ring. The drive mechanism of such an actuator is thereby controlled by the de-energisation of the motor which is achieved by the actuation of torque and/or limit switches directly operable either by the axial movement of the wormshaft due to torque output (load) or the rotation of the output shaft (centre column of the actuator) indicating an output position of the actuator.

Actuators of the kind described above operate satisfactorily, but present conventional arrangements have some disadvantages one of which is the problems involved in the operation and maintenance of the clutching mechanism due to its location on a shaft taking a high torque.

The present invention sets out to overcome this disadvantage by providing a drive arrangement incorporating an intermediate shaft assembly, the motor being drivably connected with the intermediate shaft assembly by a conventional worm and wheel, and the intermediate shaft assembly being drivably connected with the main output shaft by a final drive consisting for example, of a spur gear or helical gear and pinion.

The drive arrangement of the invention enables the hand/auto clutching mechanism to be located as part of the intermediate shaft assembly and the invention is particularly concerned with the construction and operation of the clutching mechanism of the intermediate shaft assembly.

The provision of the intermediate shaft assembly in the drive mechanism of the invention also enables a more efficient and compact drive arrangement to be provided in that the worm/wormwheel ratio may be reduced. The arrangement also gives more flexibility in that a range of speeds can be obtained when limited to only two or three motor input speeds.

In order that the invention may be clearly understood a preferred embodiment will now be described by way of example with reference to the accompanying drawings in which.

Figure 1:
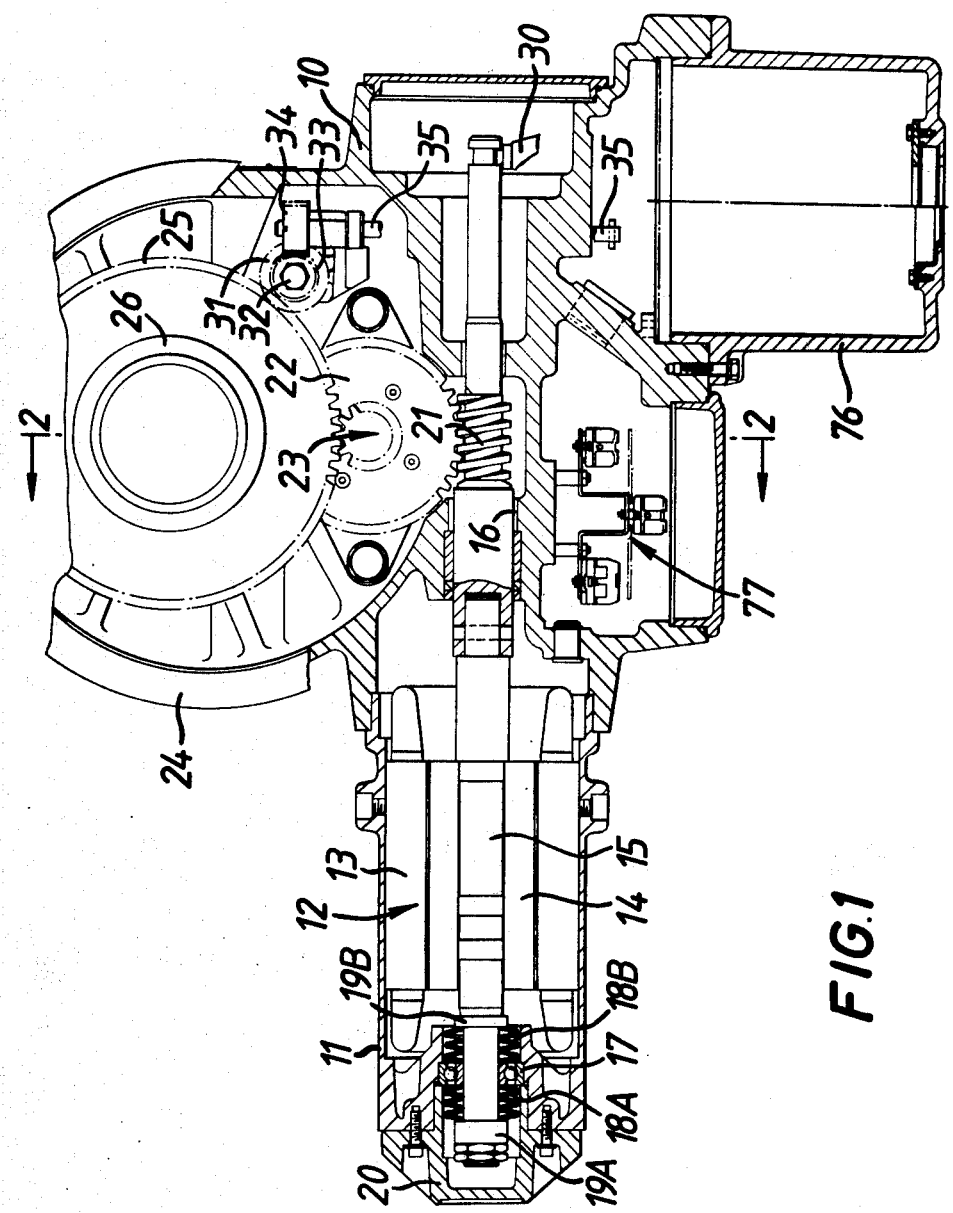
FIG. 1 is a sectional plan view through an actuator in accordance with the invention.

Referring now to the drawings and in particular to FIG. 1, the actuator of the invention comprises a main casing 10 which is normally positioned substantially vertically and to which is attached a horizontally located casing 11 which communicates with main casing 10 and houses a reversible electric motor 12. The motor 12 comprises a fixed stator 13 and a rotor 14 which is attached to the driving shaft 15 of the motor. One end of shaft 15 extends into casing 10 and is supported by main needle bearing 16. The other end of the shaft 15 in casing 11 is supported by a ball bearing 17 and axial movement of the motor shaft 15 in its bearings is permitted by a spring arrangement which comprises a pack of Belleville washers 18A and 18B located one on each side of bearing 17 and engaging at their outer ends shoulders or other projections 19A and 19B carried by the shaft. The arrangement ensures the return of the shaft 15 to its normal or central position following axial movement in one or other direction as will be hereinafter described.

The motor casing 11 is completed by cover 20 which retains bearing 17 in position.

A worm 21 is rigidly coupled to the motor shaft 15 in the main casing 10 and the worm is at all times in driving engagement with a wormwheel 22 which is mounted as will be hereinafter described on an intermediate shaft assembly which is indicated generally in FIG. 1 by reference 23 and which is located in a short housing 24.

The intermediate shaft assembly 23 includes a manually operable clutching mechanism whereby wormwheel 22 may be drivably connected with a spur gear 25 fixedly attached to a hollow output shaft 26 also vertically located in housing 24. The output shaft 26 is retained in housing 24 by the location of gear 25 between the main journal end faces. The output shaft 26 has end oil seals 27 which are retained axially in housing 24 by plates 28. The shaft 26 has a keyed extension 29 for connection to a member such as a valve spindle (not shown).

The actuator as described above is normally operated by motor 12 to rotate the output shaft 26 in one or other direction and as previously mentioned the drive mechanism may be controlled by de-energisation of the motor in response to torque output and/or the output position of the actuator. In this connection torque control is achieved by the axial movement of the motor shaft 15 in response to a predetermined torque due e.g. to resistance to movement of the valve and this axial movement is utilized to operate torque switches in the motor circuit by means of the torque responsive arm 30 (FIG. 1). The position control of the actuator is determined by the rotation of the output shaft 26 and as shown in FIG. 1 the spur gear 25 is in driving engagement with a pinion 31 on a shaft 32 having a wormgear 33 meshing with wormwheel 34 on a limit shaft 35. The rotation of limit shaft 35 is utilized in conventional manner to trip limit switches in the motor circuit.

The intermediate shaft assembly 23 provides a driving connection between the wormwheel 22 and gear 25 on the output shaft 26 by means of a pinion member 36 which forms part of a manually operable clutch drive which enables the output shaft 26 to be drivably disconnected from the motor 12 for operation manually e.g. by a handwheel.

Figure 2:
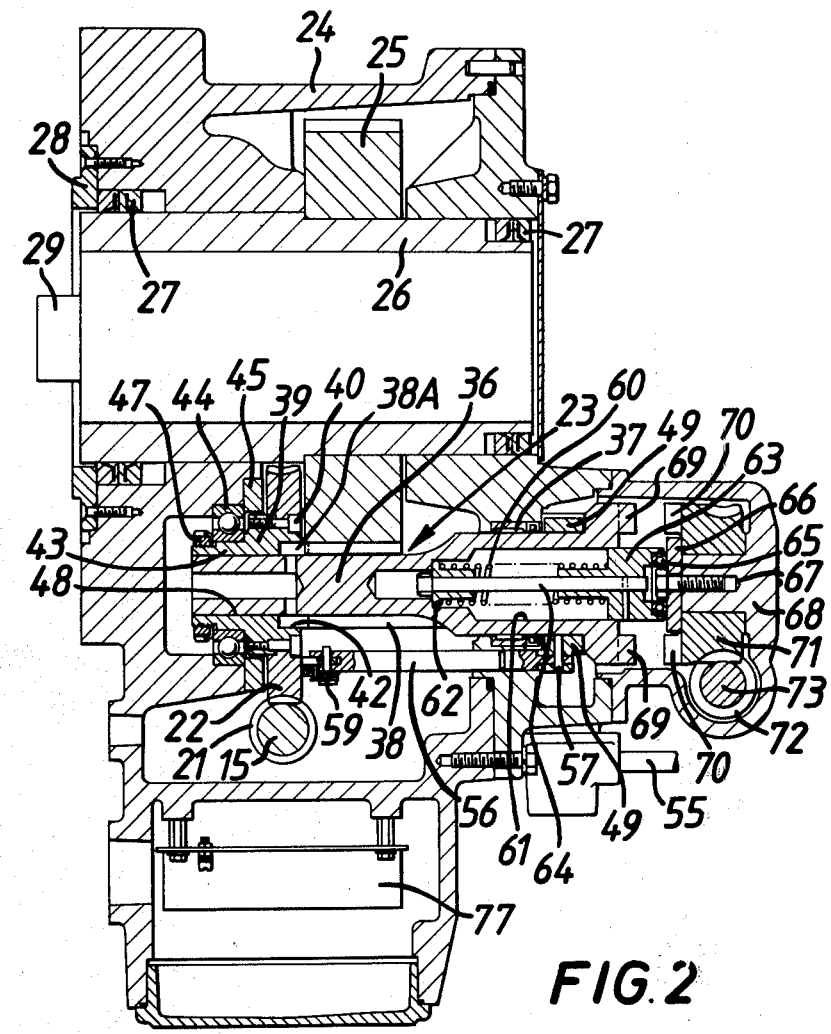
FIG. 2 is a sectional elevational view of the actuator of FIG. 1 taken on the line 2—2 of FIG. 1.
Figure 3:
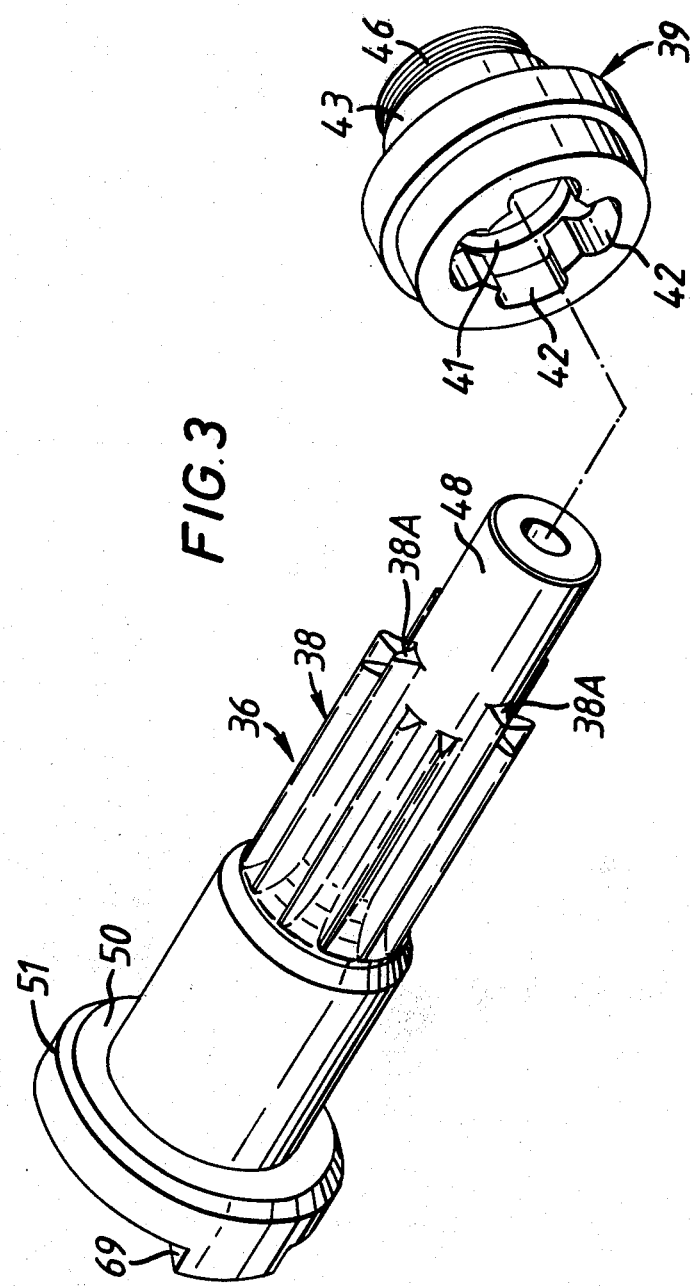
FIG. 3 is an exploded perspective view of the pinion and wormwheel hub which form part of the clutching mechanism.

The intermediate shaft assembly 23 is shown more clearly in FIGS. 2 and 3 of the drawings and it comprises basically the pinion member 36 (see FIG. 3)

which is of elongated construction and which is slidably and rotatably supported in housing 24 by a needle bearing 37. The pinion member 36 at one end is formed with a plurality of elongated teeth 38 and at its other end it forms part of the manually operable clutching mechanism.

The elongated teeth 38 on the pinion member 36 are at all times in driving engagement with the gear 25 on output shaft 26 and in one axial position of pinion member 36 the teeth 38 are also in driving engagement with the motor driven wormwheel 22 while in another axial position of pinion member 36 the driving engagement with wormwheel 22 is disengaged to permit rotation of pinion member 36 and thereby output shaft 26 by manual means.

The wormwheel 22 is provided with a steel insert or hub member 39 which is shown more clearly in the exploded view of FIG. 3 and which is mounted in wormwheel 22 and connected thereto by conventional means, such as the connecting bolts 40, as shown in FIG. 2. The hub member 39 has a central bore 41 adapted to receive pinion member 36 and at its pinion receiving end the bore 41 is enlarged to provide a number of equally spaced recesses 42 which are elongated circumferentially around the bore as will be hereinafter explained.

The other end of hub member 41 is formed with an axial extension 43 which is mounted within the inner race of a ball bearing 44 secured in housing 24 by a keep plate 45. The end portion 46 of hub member 41 is screw threaded to receive a lock nut 47 for retaining hub member 41 and its wormwheel 22 in position.

The end portion 48 of pinion member 36 is firstly of smooth configuration to fit snugly within the bore 41 of hub member 39. This part 48 of the pinion member 36 has no driving connection with the hub member 39 and is merely slidably and rotatably supported therein. Adjacent portion 48 the pinion member 36 is formed with a plurality for example, twelve elongated teeth 38, which as previously mentioned are in constant driving engagement with the spur gear 25 on output shaft 26. The ends of the teeth extend also into driving engagement with the wormwheel hub 39 but at this portion of the pinion member 36 the ends of some of the teeth are removed so as to leave a number, for example, four teeth only, shown by reference 38A (see FIG. 3). These extended teeth 38A project into corresponding recesses 42 in hub member 39 so as to provide the necessary drive from the main wormshaft 15 to the output shaft 26 of the actuator when the pinion member 36 is in its axial position as shown in FIG. 2. The recesses 42 comprise separate cut-outs each having a circumferential width greater than that of a corresponding tooth extension 38A on the pinion member. The arrangement permits more easy re-engagement on energisation of the motor drive, but in particular the arrangement enables a rotational backlash to be provided in the coupling which produces a hammer blow effect when the actuator is reversed.

As previously mentioned the pinion member 36 is axially slidable in hub member 39 (to the right as viewed in FIG. 2) for disengaging the extended teeth 38A from the recesses 42 in the hub member so as to allow independent manual rotation of pinion member 36.

Figure 4:
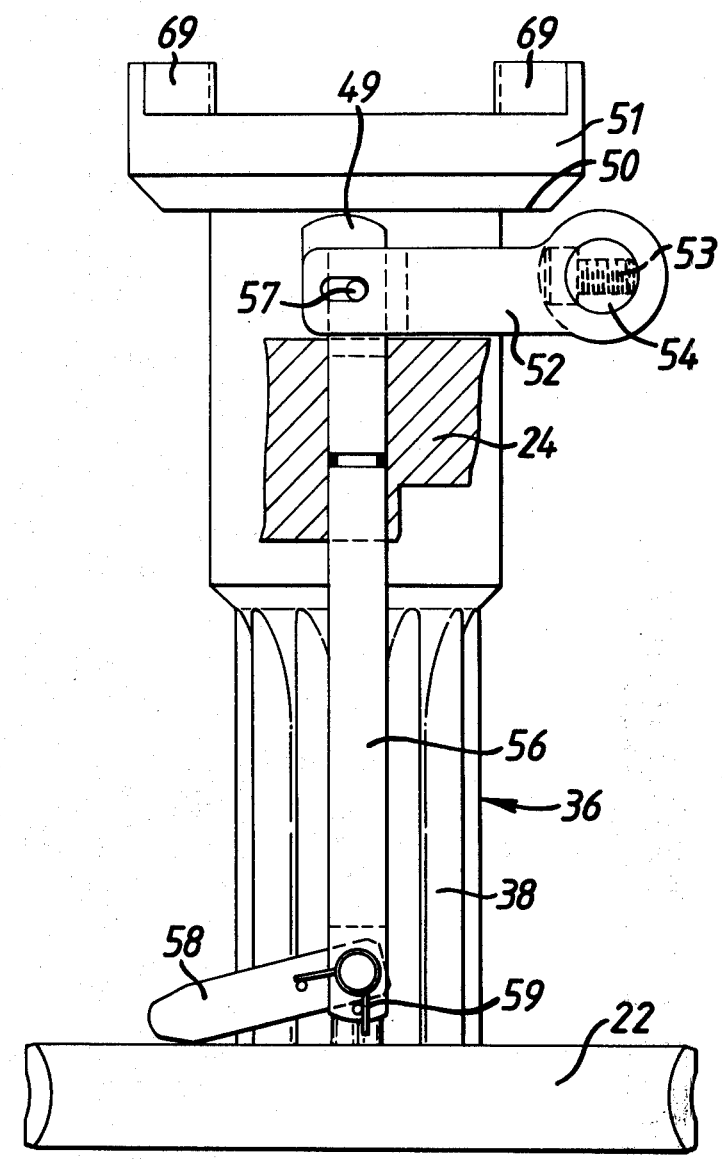
FIG. 4 is an elevational view of the latch mechanism for retaining the drive mechanism in its manual position of operation.
Figure 5:
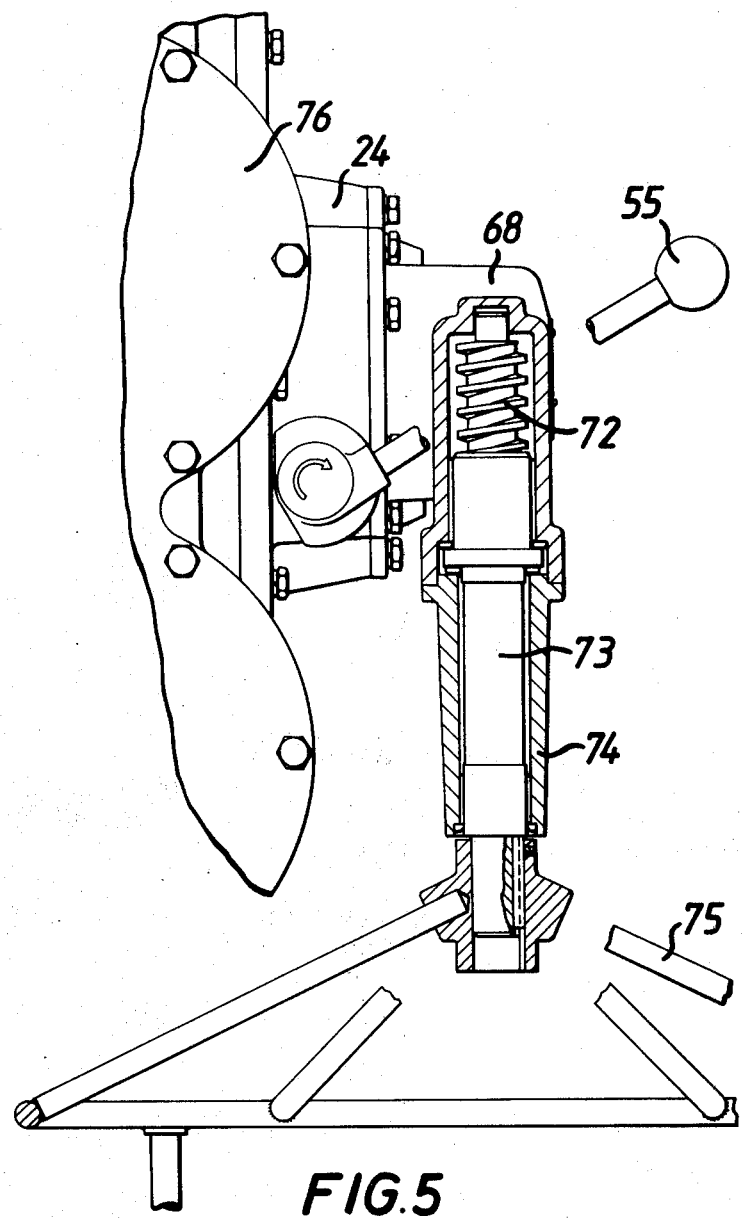
FIG. 5 is a part sectional side elevation showing the hand/auto selection lever and the handwheel drive for manual operation.

This axial movement of the pinion member 36 is obtained by a lifting yoke which comprises diametrically located members 49 bearing on an annular shoulder 50 formed in pinion member 36 by an enlarged end portion 51 (see also FIG. 4). The bearing members 49 of the lifting yoke are moved by a yoke collar 52 attached as by screw 53 to a shaft 54 which extends externally of housing 24 for manual operation by hand lever 55 (see FIGS. 2 and 5).

The pinion member 36 of the intermediate shaft assembly is held in its manual position (with the extended teeth 38A disengaged from recesses 42 in the hub member 39 of wormwheel 22) by a conventional hand/auto spring urged finger mechanism as shown in FIGS. 2 and 4.

A rod 56 is attached at one end to bearing member 49 of the yoke assembly by pin 57. The rod 56 extends along pinion member 36 and at its other end it pivotally carries a latch member 58 which engages the adjacent surface of wormwheel 22. The latch member 58 is urged by a spring 59 to assume an upright position in line with rod 56 but is maintained in the position shown in FIG. 4 during normal motor operation of the actuator. In the event of axial movement of pinion member 36 upwardly as viewed in FIG. 4, rod 56 moves upwardly with the yoke assembly to permit latch member 58 to pivot to assume its upright position in line with rod 56 to thereby hold pinion member 36 in its upper manual position.

Disengagement of the latch member 58 is effected on rotation of wormwheel 22 by the subsequent energisation of motor 12 which enables the rod 56 to move downwardly to permit the return of pinion member 36 to its motor position by a spring assembly 60.

The spring assembly 60 is located in a central bore 61 extending into pinion member 36 from its enlarged end portion 51. The spring of the spring assembly 60 seats at its ends on a pair of plug members 62 and 63 respectively mounted in bore 61. Plug member 63 is slidable in bore 61 and is attached to rod 64 which extends slidably through plug member 62 as pinion member 36 moves axially. Plug member 63 is located in the open end of bore 61 and is rotatably supported by a bearing 65 carried by a plate 66 secured by bolt 67 to end cover 68 attached to housing 24.

The end cover 68 forms part of a transversely mounted handwheel gear box mechanism. As shown in FIG. 2 the enlarged end portion 51 of pinion member 36 is formed with two or more spaced axially extending lugs or teeth 69 which are adapted to engage drivably with corresponding lugs or teeth 70 projecting axially from the side surface of a wormwheel 71 mounted in end cover 68. Wormwheel 71 is in driving engagement with a worm 72 on handwheel shaft 73 (FIG. 5) mounted in transverse housing 74. A handwheel 75 is fitted externally to shaft 73 for manual operation of the actuator.

The actuator as described above is normally driven by motor 12 to rotate output shaft 26 with the pinion member 36 of the intermediate shaft assembly 23 in its motor position as shown in FIG. 2 in which the extended teeth 38A are in driving engagement with the recesses 42 of the hub 39 of wormwheel 22. In order to effect a change to manual operation the lever 55 is manually operated to lift pinion member 36 by the yoke assembly 49 against the spring assembly 60 so as to disengage the extended teeth 38A from the recesses or cut-outs 42. The length of the extended teeth 38A is such that the teeth 38A are disengaged from the wormwheel hub before the lugs or teeth 69 are drivably engaged with the lugs or teeth 70 on the manually rotatable wormwheel 71. As the lugs or teeth 69 and 70 are drivably engaged the latch member 58 is able to assume its upright position in engagement with the stationary wormwheel 22 so as to hold the pinion member 36 in its manual uppermost position. In this position the output shaft can be independently rotated by handwheel 75 until motor 12 is energised to release the latch mechanism.

The housing 24 is completed by the provision of the usual electrical control box housing 76 and switches shown at 77.

We claim:

1. A motorised actuator comprising a driven shaft, a motor for driving said driven shaft, an output shaft, and an intermediate shaft assembly, said motor driven shaft being drivably connected with the shaft of said intermediate shaft assembly by a wormgear mesh comprising a worm on said motor driven shaft and a wormwheel on said intermediate shaft, a pinion member slidably mounted on said intermediate shaft and formed with a plurality of elongated teeth at all times in driving engagement with an output gear on said output shaft, a plurality of recesses formed in said wormwheel, said pinion member being slidably relative to said output gear for drivably engaging the teeth of said pinion member with the recesses in said wormwheel, and a clutching mechanism for selectively moving said pinion member slidably into and out of driving engagement with said wormwheel so as to permit independent operation of said intermediate shaft assembly and thereby said output shaft by manual means, characterized in that the ends of selected teeth on said pinion member are extended for engagement with the recesses in said wormwheel, and that the width of each recess is substantially larger than the width of the extended teeth of said pinion member.

2. The actuator of claim 1, wherein a separate hub is mounted on said wormwheel, said recesses are formed in the hub, and said hub rotatably and slidably supports the said pinion member at one end thereof.

3. The actuator of claim 1 or 2 comprising means for manually moving said pinion member axially to disengage said pinion from driving engagement with said wormwheel, said manual means comprising a yoke assembly having latch means for holding said pinion member in a position disengaged from said driven shaft.

4. The actuator of claim 3 wherein said latch means engages the adjacent surface of said wormwheel for releasing said latch means upon energisation of said motor.

5. The actuator of claim 1 or 2 wherein said pinion member is movable axially to engage drivably with an independent drive means manually operable by an external handwheel.

6. The actuator of claim 5, wherein said independent drive means comprises a worm and wormwheel, and said wormwheel is formed with spaced driving lugs which are engageable with spaced driving lugs projecting axially from the adjacent end of said pinion member.

7. The actuator of claim 1 or 2, wherein said intermediate shaft assembly comprises a spring assembly normally urging said pinion member axially to engage said pinion member drivably with said motor shaft assembly.

8. An apparatus for actuating a movable mechanical device, said apparatus comprising a driven shaft provided with a worm, means for driving said driven shaft, an output shaft, means comprising an intermediate shaft having a wormwheel which meshes with said worm to drivably connect the driven shaft to the intermediate shaft, a pinion slidable with respect to the output shaft to engage said wormwheel, and a clutch means for alternately sliding the pinion into and out of driving engagement with said wormwheel to enable independent manual operation of the intermediate and output shafts, said pinion having spaced selected teeth which are elongated and engage said recesses, the recesses being substantially wider than the width of said elongated teeth, whereby backlash results because of the space in the recesses about the teeth meshing therewith.

* * * * *